(12) United States Patent
Pavley

(10) Patent No.: US 6,445,460 B1
(45) Date of Patent: Sep. 3, 2002

(54) METHOD AND SYSTEM FOR PROVIDING AND UTILIZING FILE ATTRIBUTES WITH DIGITAL IMAGES

(75) Inventor: John F. Pavley, Cupertino, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/290,559

(22) Filed: Apr. 13, 1999

(51) Int. Cl.[7] .............................................. G06K 15/00
(52) U.S. Cl. ...................................... 358/1.15; 358/1.9
(58) Field of Search ............................... 358/1.9, 1.15, 358/1.18, 501, 401, 403

(56) References Cited

U.S. PATENT DOCUMENTS

| | | | | |
|---|---|---|---|---|
| 5,369,742 A | * | 11/1994 | Kurosu | 395/147 |
| 5,706,097 A | * | 1/1998 | Schelling | 358/296 |
| 5,974,229 A | * | 10/1999 | Yoshino | 395/109 |
| 6,295,079 B1 | * | 9/2001 | Saito | 347/255 |
| 2001/0028474 A1 | * | 10/2001 | Parulski et al. | 358/1.16 |

* cited by examiner

Primary Examiner—Jerome Grant, II
(74) Attorney, Agent, or Firm—Sawyer Law Group LLP

(57) ABSTRACT

Method and system aspects for providing more automatic image file handling with a digital image capture device. The present invention includes the designation of at least one file format attribute of a plurality of file format attributes for captured digital images in the digital image capture device. Further included is the establishment of one or more rule sets for digital image file handling based on the plurality of file format attributes, and the manipulation of digital image files according to a selected rule set of the one or more rule sets. The automatic file handling extends to a photosystem environment that includes at least one computer system coupled to the digital image capture device that also provides and utilizes file attributes for automatic image file handling.

18 Claims, 6 Drawing Sheets

METHOD AND SYSTEM FOR PROVIDING AND UTILIZING FILE ATTRIBUTES WITH DIGITAL IMAGES

FIELD OF THE INVENTION

The present invention relates generally to an image capture device, and more particularly to providing and utilizing file attributes in an image capture device.

BACKGROUND OF THE INVENTION

In general, modern digital cameras for taking pictures of scenes and the like typically include an imaging device which is controlled by a computer running a single threaded process. When an image is captured, the imaging device is exposed to light and generates raw image data representing the image. The raw image data is typically stored in a single image buffer where it is then processed and compressed by the processor. Many types of compression schemes are used to compress the image data, with the joint photographic expert group (JPEG) standard being the most popular. After the processor processes and compresses the raw image data into JPEG image files, the processor stores the JPEG image files into an internal memory or on an external memory card.

Once stored, the manipulation of image files normally requires significant user interaction. For example, if a user wants to delete an image that has been copied from a camera's storage to an external storage device, the user is required to perform the selection, copying, and deletion of the image file in an individual and manual manner. Thus, a need exists for automatic handling of digital images within a digital camera and between a digital camera and an external computer system to ease image file management. The present invention addresses such a need.

SUMMARY OF THE INVENTION

The present invention provides aspects for providing more automatic image file handling for a digital image capture device. The present invention includes the designation of at least one file format attribute of a plurality of file format attributes for captured digital images in the digital image capture device. Further included is the establishment of one or more rule sets for digital image file handling based on the plurality of file format attributes, and the manipulation of digital image files according to a selected rule set of the one or more rule sets. The automatic file handling extends to a photosystem environment that includes at least one computer system coupled to the digital image capture device that also provides and utilizes file attributes for automatic image file handling.

Through the present invention, provision of file attributes supports efficient handling and management of image files with a digital image capture device. These and other advantages of the aspects of the present invention will be more fully understood in conjunction with the following detailed description and accompanying drawings.

DETAILED DESCRIPTION OF THE INVENTION

The present invention relates to a method and system for providing and utilizing file attributes with digital image files to produce more automatic handling and management of digital image files. The following description is presented to enable one of ordinary skill in the art to make and use the invention and is provided in the context of a patent application and its requirements. Although the present invention will be described in the context of a still digital requirements. Although the present invention will be described in the context of a still digital camera, various modifications to the preferred embodiment will be readily apparent to those skilled in the art and the generic principles herein may be applied to other embodiments. That is, any digital imaging capture device which captures, stores, or displays digital images, could incorporate the features described hereinbelow and that device would be within the spirit and scope of the present invention. Thus, the present invention is not intended to be limited to the embodiment shown but is to be accorded the widest scope consistent with the principles and features described herein.

Figure 1:
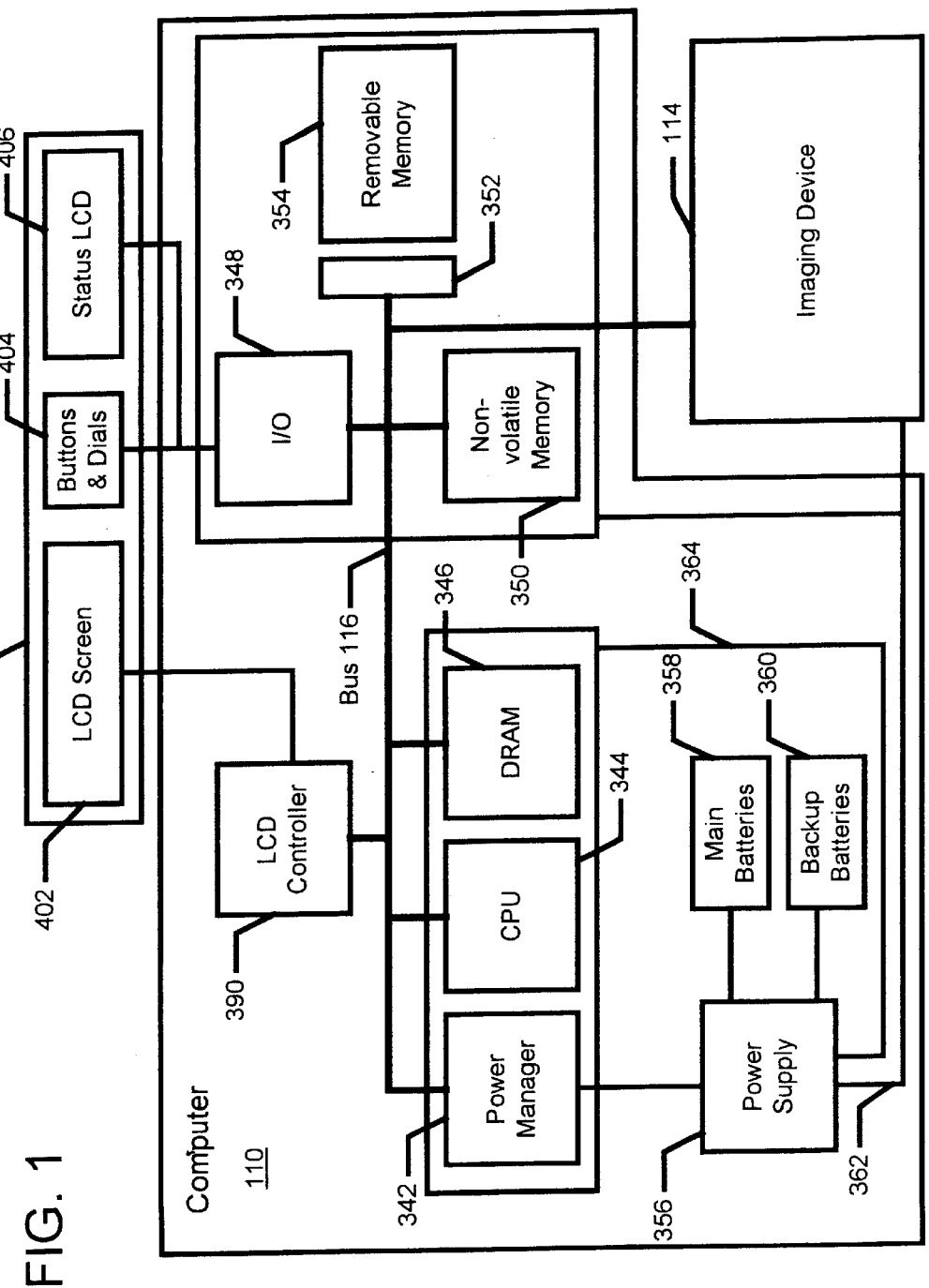
FIG. 1 illustrates a block diagram of one preferred embodiment of a digital camera 110 is shown for use in accordance with the present invention.

Referring now to FIG. 1, a block diagram of one preferred embodiment of a digital camera 110 is shown for use in accordance with the present invention. Camera 110 preferably comprises an imaging device 114, a system bus 116 and a computer 118. Imaging device 114 includes an image sensor, such as a charged coupled device (CCD) or a CMOS sensor, for generating a set of raw image data representing a captured image. In a preferred embodiment, system bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352 that connect an optional removable memory 354 to system bus 116.

CPU 344 may include a conventional microprocessor device for controlling the operation of camera 110. In the preferred embodiment, CPU 344 is capable of concurrently running multiple software routines to control the various processes of camera 110 within a multithreaded environment. For example, images may be captured at the same time that previously captured images are processed in the background to effectively increase the capture rate of the camera. In a preferred embodiment, CPU 244 runs an operating system that includes a menu-driven GUI and provides image processing through software, rather than hardware. An example of such software is the DIGITA Operating Environment by FlashPoint Technology of San Jose, Calif. Although CPU 344 is preferably a microprocessor, one or more DSPs (digital signal processor) or ASICs (Application Specific Integrated Circuit) could also be used.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, such a flash disk, readily removable and replaceable by a camera 110 user via buffers/connector 352.

Power supply 356 supplies operating power to the various components of camera 110. Power manager 342 communicates via line 366 with power supply 356 and coordinates power management operations for camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Dynamic Random-Access-Memory (DRAM) 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 is temporarily stored in several input buffers (not shown) within DRAM 346. Once the raw image data is processed, it is stored in a frame buffer (not shown) for display on the LCD screen 402. In a preferred embodiment, the input buffers and the frame buffer are split into two ping-pong buffers to improve the display speed of the digital camera and to prevent the tearing of the image in the display 402. After processed image data has been stored in DRAM 346, LCD controller 390 transfers the image data to LCD screen 402 for display.

Figure 2A:
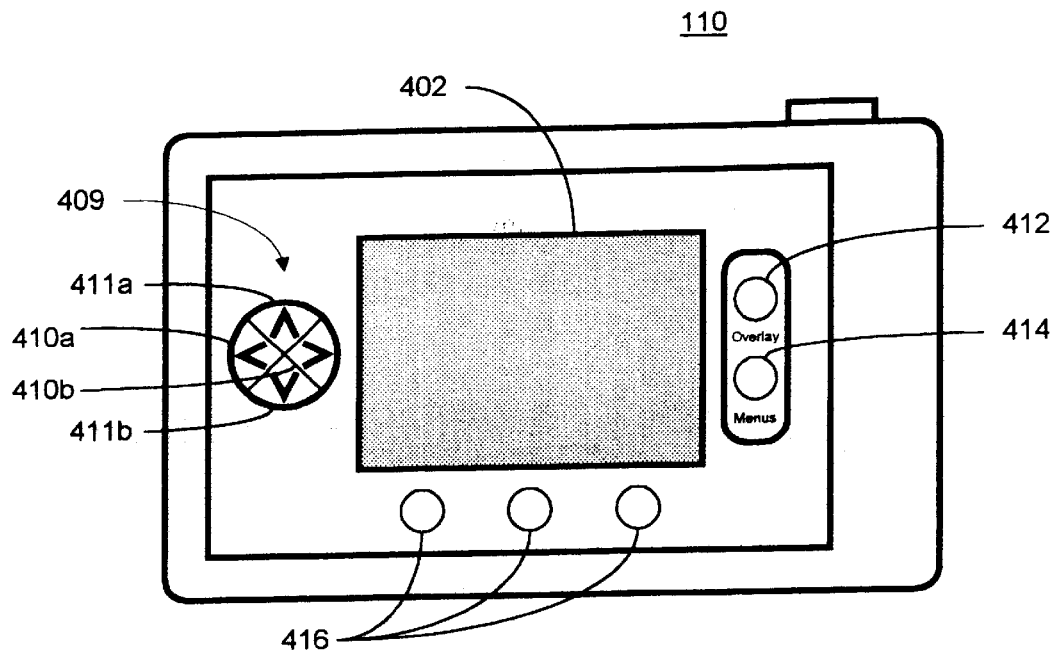
FIGS. 2A and 2B are diagrams depicting exemplary hardware components of the camera's user interface.
Figure 2B:
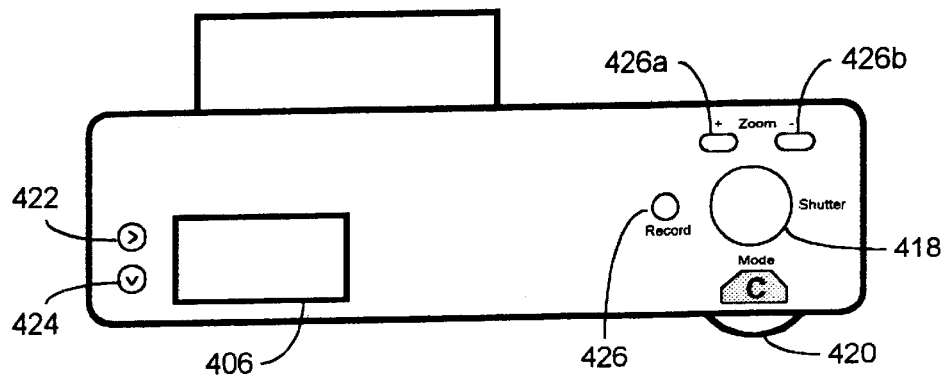

FIGS. 2A and 2B are diagrams depicting exemplary hardware components of the camera's user interface 408. FIG. 2A is back view of the camera 110 showing the LCD screen 402, a four-way navigation control button 409, an overlay button 412, a menu button 414, and a set of programmable soft keys 416. FIG. 2B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

The camera operates in at least two modes, capture mode for capturing images, and play mode for playing back the captured images on the LCD screen 402. Further preferably included is a review mode.

Figure 3:
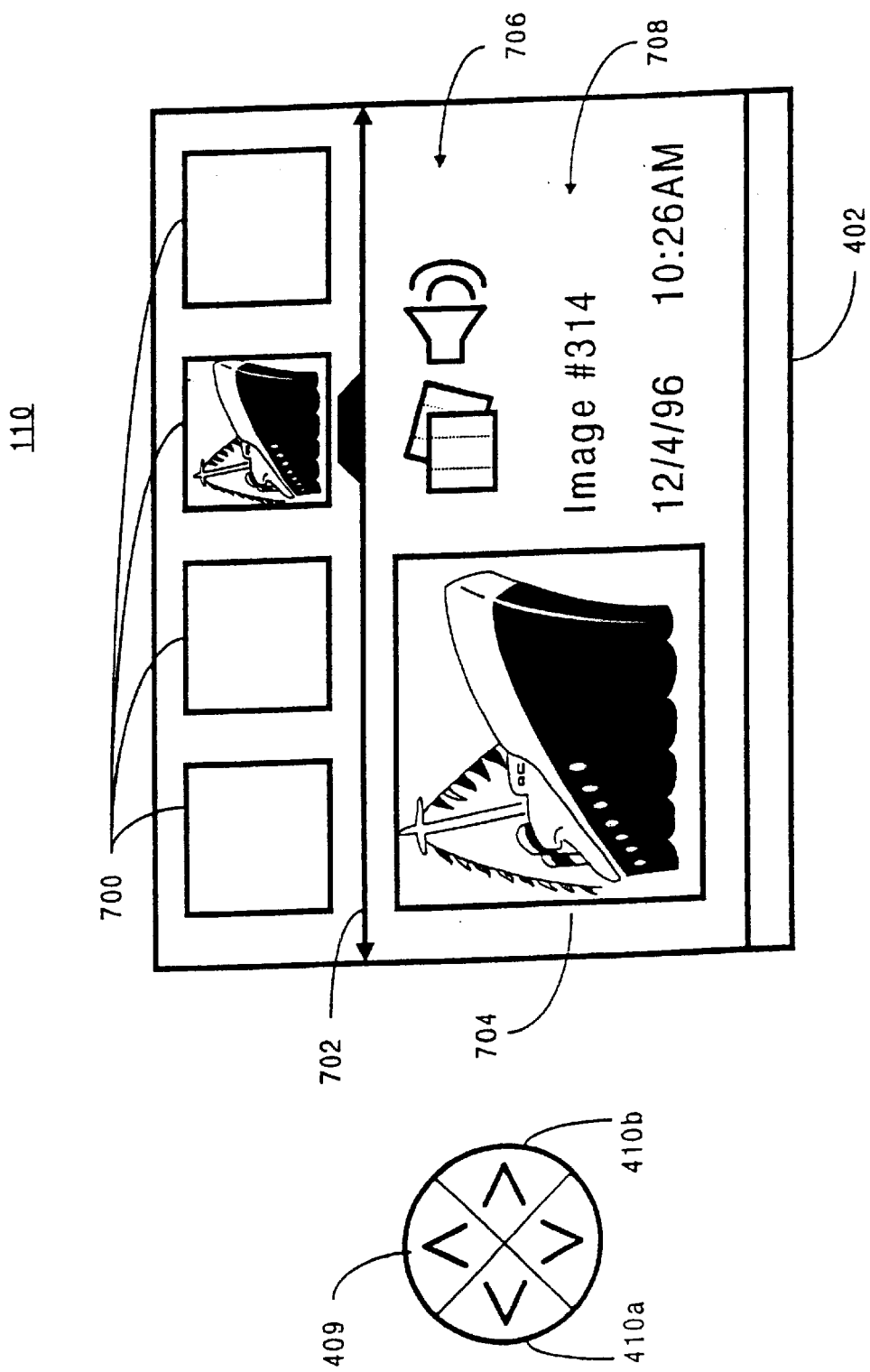
FIG. 3 is a diagram illustrating the operation and appearance of the user interface when the camera is placed into review mode.

Referring now to FIG. 3, a diagram illustrating the operation and appearance of the user interface when the camera is placed into review mode is shown. The review mode enables the user to view all the images in the camera along with specific attributes associated with each of the images.

The review screen layout is based on a filmstrip metaphor which allows users to quickly move forward and backward among pictures chronologically. In a preferred embodiment, several small-sized versions of the captured images, called thumbnails 700, are displayed in a row across the LCD screen 402. The user may scroll through the series of displayed thumbnails 700 in the LCD screen 402 using the four-way navigation control button 409. The direction of scrolling is capably mapped to the horizontal left/right buttons 410a and 410b. When the user presses the left/right buttons 410, the thumbnails 700 are scrolled-off the LCD screen 402 and replaced by new thumbnails 700 representing other captured images.

A stationary selection arrow line 702 is used as both a navigational aid and to indicate which thumbnail is the currently selected image. When there are more than four images in the camera, the selection arrow line 702 displays arrow heads to indicate movement in that direction is possible with the left/right navigation buttons 410. As the user presses the navigation buttons 410 and the thumbnails 700 scroll across the LCD screen 402, the thumbnail 700 that is positioned over a notch in the selection arrow line 702 is considered the selected image.

When a thumbnail 700 becomes the selected image, additional information corresponding to that image is automatically displayed. In a preferred embodiment, the additional information includes a large thumbnail 704 showing a larger view of the selected thumbnail, and image information comprising an icon bar 706 and text 708. The icon bar may display several icons indicating the media types associated with the active image, such as whether the image is a still, a time lapse, or a burst image, whether sound is attached to the image, and a category for the image. The displayed text 708 may include a specification of the name or number of the image, and the date and time the image was captured.

Figure 4:
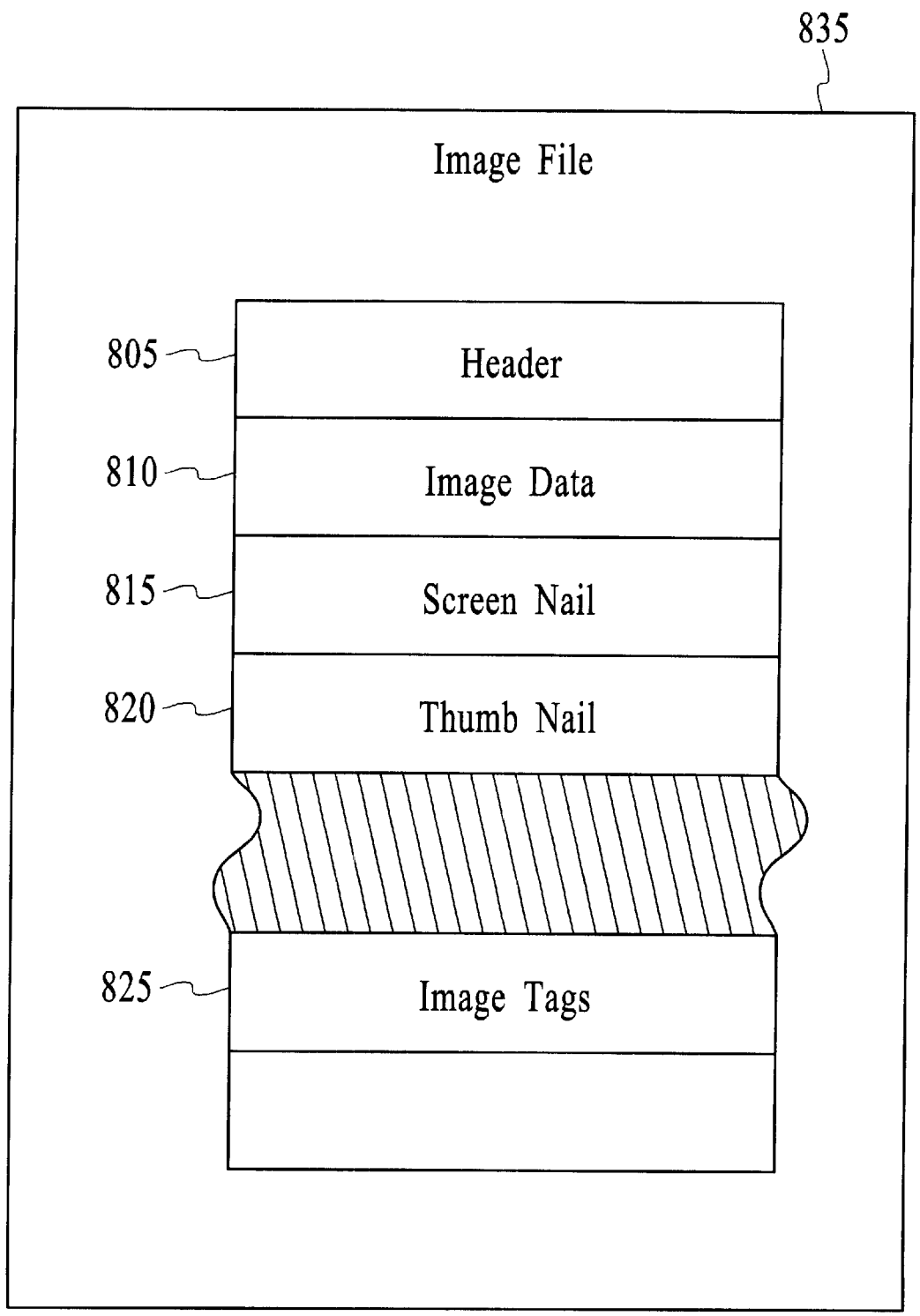
FIG. 4 illustrates a diagram of one embodiment for an image file.

FIG. 4 illustrates a diagram of one embodiment for an image file 835. Image file 835 includes a header 805, image data 810, a screennail 815, a thumbnail 820, and image tags 825.

Header 805 preferably includes information that identifies and describes the various contents of image file 835. Image data 810 contains actual captured image data. Image data 810 exists in whichever format that is appropriate for the current location of image file 835 within the image processing chain of the camera 110. Screennail 815 and thumbnail 820 are each different versions of image data 810 that have varying degrees of reduced resolution for a number of special viewing applications.

Figure 5:
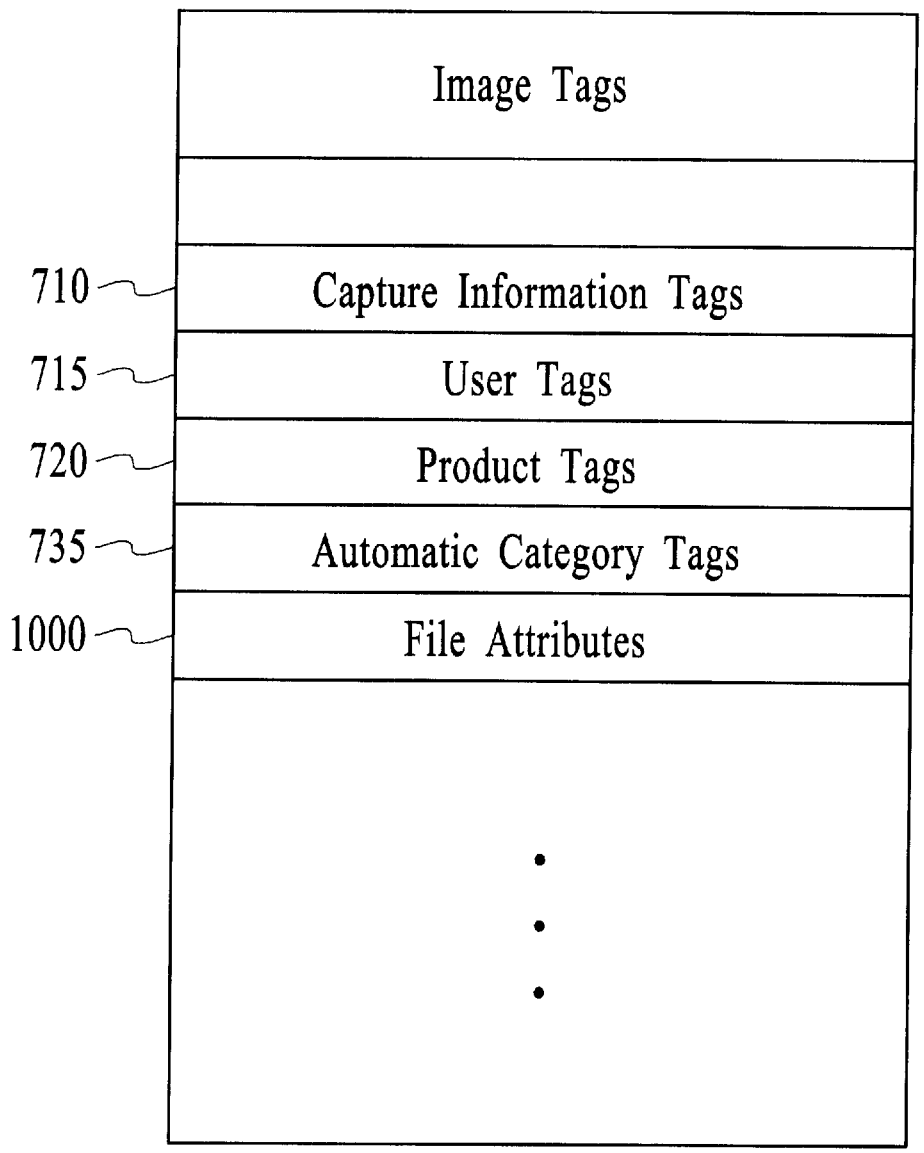
FIG. 5 illustrates a diagram of one embodiment for the image tags.

Image tags 825 include various types of information that correspond and relate to particular captured image data 810, as discussed in conjunction with FIG. 5.

Referring to FIG. 5, a diagram of one embodiment for the image tags 825 is shown. In the FIG. 5 embodiment, image tags 825 include capture information tags, user tags 715, product tags 720, and automatic category tags 735. Capture information tags 710 preferably include various types of information that preserve command settings at the moment of capture and correlate with the capture image data 810. For example, capture information tags 710 may indicate focus setting, aperture setting, and other relevant information that may be used for effectively processing or analyzing the corresponding image data. User tags 715 include those labels a user specifies for a given image, often referred to as 'stamps', such as 'birthday' or 'vacation', etc., that aid in personal categorization of the images of any text data. Product tags 720 typically contain various other information, such as camera 110 manufacturer.

Automatic category tags 735 result from analysis of the image data, such as described in co-pending U.S. patent application, Ser. No. 09/121,760, entitled "System and Method for Automatic Analysis and Categorization of Images in an Electronic Imaging Device", assigned to the assignee of the present invention, and filed Jul. 23, 1998. For example, individual image analysis may generate automatic category tags 735 based on detection of a person or groups of persons according to characteristics, like substantial amounts of flesh tones within the image. Category tags resulting from detection of nature scenes from characteristics, like substantial green content in the image combined with the relative lack of hard edges, are also possibly automatically generated. Similarly, categories like city images, water images, or indoor images may be detected by characteristic features contained in those images.

In addition to image tags 825, in accordance with the present invention, file attribute designations 1000 are provided for image files. File attribute designations, while unused with digital image files, are well known and used in most computer systems. For example, DOS, WINDOWS, WINDOWS NT, UNIX, and MAC operating systems employ file attributes that act as metadata for a file. A minimum subset of file tags referred to herein as file attribute designations for digital image files includes a read-only file attribute, a hidden file attribute, an archive file attribute, and a system file attribute. A read-only file attribute marks an image file as one that cannot be changed, edited, or deleted. A hidden file attribute provides a privacy feature that allows certain image files to be hidden and requires a password to access the file. Archive file attributes designate image files that have undergone a backup procedure and can be safely deleted from local storage. System file attributes designate certain files as necessary files that affect the system's operations. An image file is capable of including one or more of the file attribute designations through the setting or resetting of designated bits associated and stored with the image file.

Figure 6:
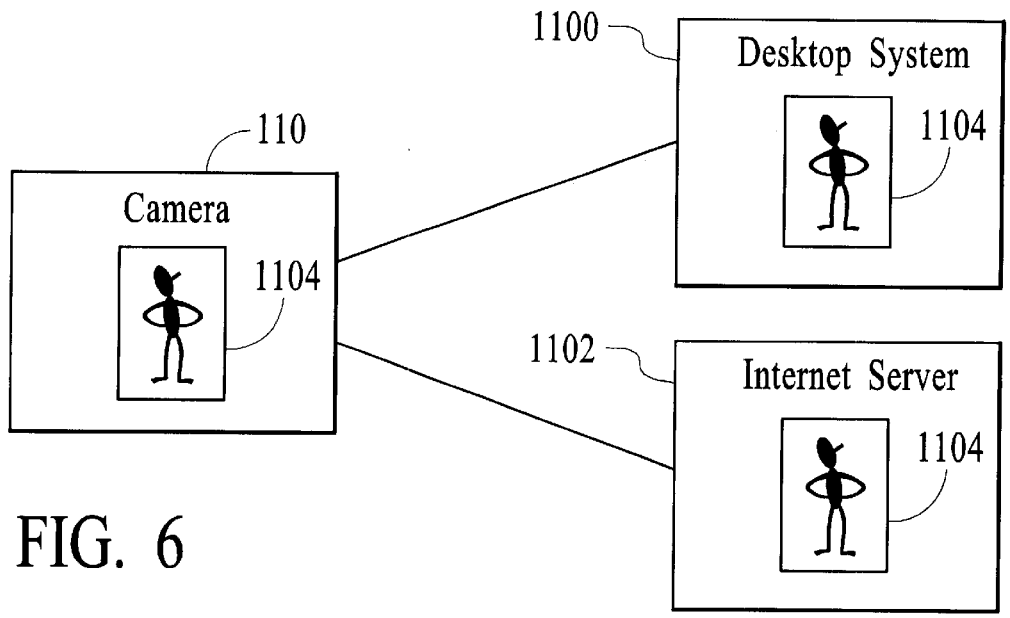
FIG. 6 illustrates a photosystem environment in accordance with the present invention.

With the present invention, file attributes are used in order to synchronize file handling in a photosystem environment, i.e., between a digital camera 110 and an externally connected computer system, as represented in FIG. 6. For purposes of illustration, camera 110 is shown connected with a desktop computer system 1100 and an Internet web server computer processing system 1102. The specific hardware configurations of system 1100 and 1102 are user-dependent, but preferably include an operating system environment compatible with camera 110, e.g., include support for the DIGITA operating environment. With a common operating environment, an image file 1104 that includes file attribute designations in accordance with the present invention is successfully and automatically handled within the photosystem environment based on established rule sets.

For the purpose of the present invention, rule sets refer to user-defined routines for achieving a particular goal for an image file. By way of example, maximizing available storage space is a common goal within digital image capture devices. Thus, a rule set may be established that reclaims storage space among stored image files based on their file attribute designations. For example, when an attempt to take an image results in an indication that more storage space is needed, a storage rule set may be initiated to reclaim enough storage space to take an image. The storage rule set may be based on deleting image files from memory that have an archive file attribute, since an archive file attribute indicates that the image file exists in a backup form elsewhere, such as on desktop system 1100. Preferably, the application of the rule set occurs as a background process that has been set up by a user prior to image capture.

By way of further example, a goal may be established to conserve time by automatically having image transfer occur between the camera 110 and a computer system, e.g., system 1100, in the photosystem environment. A rule set establishes that image files not marked as archived are copied from the camera 110 to the system 1100 upon connection and are then marked as archived with an archive file attribute by the system 1100. Of course, these are just two example of the type of automatic image file handling capable of being achieved through the utilization of file attribute designations. Other examples include using the 'hidden' attribute to hide photos from the desktop, such as for personal photos in a multiuser camera, and using the read-only attribute to prevent a desktop system from deleting particular photos.

Figure 7:
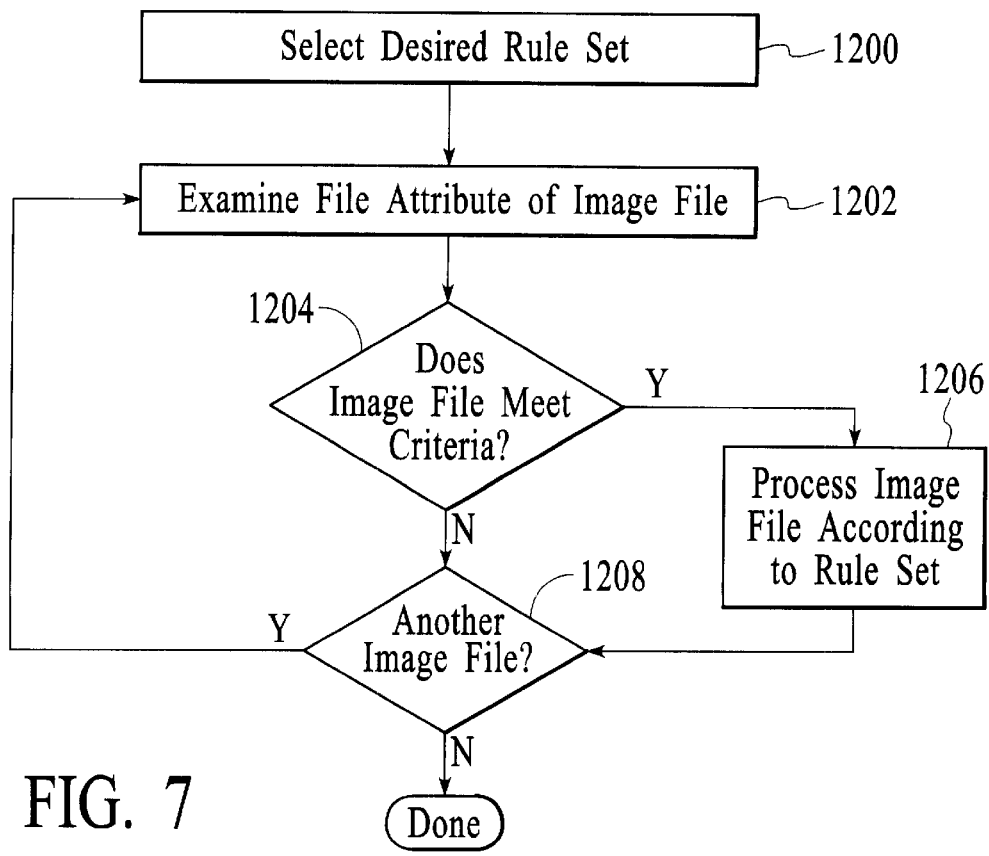
FIG. 7 illustrates a block flow diagram for utilizing file attributes in a photosystem environment in accordance with the present invention.

FIG. 7 illustrates a flow diagram of an overall process for automatic image file handling in accordance with the present invention. The process initiates with selection of a desired rule set (step 1200). The rule set may be set up and selected in the camera 110, the desktop system 1100, and/or the server system 1102. A system's file manager program supports application of a rule document on a list of files by opening each image file and examining the file attribute(s) associated with an image file (step 1202). A determination is then made as to whether the image file meets the criteria of the rule set (step 1204). If it does meet the criteria, the image file is processed according to the rule set (step 1206). For example, when the priority is to save time, the system 1100 determines whether an archive attribute is set for an image file. When not set, the system 1100 appropriately performs the action of copying the file from the camera 110 and marking the file with the archive attribute. If the archive attribute has been set, the system 1100 can proceed to the next image file.

By way of further example, the following pseudo-code represents an 'archive test' rule where an archived image file is deleted.

<Rules>
  <Rule ID="/" Test="Archive">
    <Action Match="True">
      delete
    </Action>
    <Action Match="False">
      none
    </Action>
  </Rule>
</Rules>

Once the image file is processed, or when the image file does not meet the criteria, the process continues with a next image file until all the image files have been processed, as determined via step 1208. Accordingly, the use of file attribute designations supports automatic handling of image files through the use of preprogrammed rule sets provided as part of the image file processing environment.

Although the present invention has been described in accordance with the embodiments shown, one of ordinary skill in the art will readily recognize that there could be variations to the embodiments and those variations would be within the spirit and scope of the present invention. In addition, software written according to the present invention may be stored on a computer-readable medium, such as a removable memory, or transmitted over a network, and loaded into the digital camera for execution. Accordingly, many modifications may be made by one of ordinary skill in the art without departing from the spirit and scope of the appended claims.

What is claimed is:

1. A method for providing automatic image file handling, the method comprising:

capturing digital images in the digital image capture device;

designating at least one file format attribute for a digital image file of a captured digital image; and utilizing the at least one file format attribute for automatic file handling of the digital image file within a photosystem environment, wherein the at least one file format attribute comprises at least one of read-only attribute, a hidden attribute, an archive attribute, and a system attribute.

2. The method of claim 1 wherein the photosystem environment including a digital image capture device and a computer system.

3. The method of claim 2 wherein designating at least one file format further comprises designating a digital image file with an archive file format attribute when the digital image file has been backed-up in the computer system of the photosystem environment.

4. The method of claim 3 wherein utilizing the at least one file format further comprises deleting the digital image file marked with an archive file format attribute in the digital image capture device to free space for further image capture in the digital image capture device.

5. The method of claim 4 wherein the steps of designating and utilizing occur as a background process in the photosystem environment.

6. The method of claim 1 wherein the at least one file format attribute is recognizable across operating systems.

7. A method for automatic image file handling in a digital image capture device, the method comprising:

designating at least one file format attribute of a plurality of file format attributes for captured digital images in the digital image capture device, the plurality of file format attributes comprising a read-only attribute, a hidden attribute, an archive attribute, and a system attribute;

establishing one or more rule sets for digital image file handling based on the plurality of file format attributes; and manipulating digital image files according to a selected rule set of the one or more rule sets.

8. A method for automatic image file handling in a digital image capture device, the method comprising:

designating at least one file format attribute of a plurality of file format attributes for captured digital images in the digital image capture device;

establishing one or more rule sets for digital image file handling based on the plurality of file format attributes; and manipulating digital image files according to a selected rule set of the one or more rule sets, wherein a storage reclaiming rule set determines availability of captured image files for freeing storage space based on the file format attributes of the captured image files.

9. The method of claim 8 wherein establishing one or more rule sets further comprises establishing a storage reclaiming rule set.

10. The method of claim 8 wherein establishing one or more rule sets occurs in the digital image capture device.

11. The method of claim 8 wherein manipulating occurs automatically in a computer processing system when the digital image capture device communicates with the computer processing system.

12. The method of claim 11 wherein the computer processing system further comprises a desktop computer system.

13. The method of claim 11 wherein the computer processing system further comprises an Internet server system.

14. A system for providing automatic image file handling, the system comprising:

a digital image capture device for capturing digital images and automatically increasing storage space by eliminating captured image files with an archive attribute when storage capacity needs to be increased during an image capture session; and at least one computer system coupled to the digital image capture device, wherein file attribute designation for captured digital images occurs by at least one of the digital image capture device and the at least one computer system for utilization with one or more rule sets for automatic image file handling.

15. The system of claim 14 wherein the at least one computer system automatically transfers captured image files from the digital image capture device and designates the transferred image file with an archive attribute.

16. The system of claim 14 wherein the at least one computer system further comprises a desktop computer system.

17. The system of claim 14 wherein the at least one computer system further comprises an Internet server system.

18. A system for providing automatic image file handling, the system comprising:

a digital image capture device for capturing digital images; and at least one computer system coupled to the digital image capture device, wherein file attribute designation for captured digital images occurs by at least one of the digital image capture device and the at least one computer system for utilization with one or more rule sets for automatic image file handling, and further wherein a plurality of file format attributes comprises a read-only attribute, a hidden attribute, an archive attribute, and a system attribute.

* * * * *

UNITED STATES PATENT AND TRADEMARK OFFICE
CERTIFICATE OF CORRECTION

PATENT NO. : 6,445,460 B1  
APPLICATION NO. : 09/290559  
DATED : September 3, 2002  
INVENTOR(S) : John Pavley Page 1 of 1

It is certified that error appears in the above-identified patent and that said Letters Patent is hereby corrected as shown below:

In the Drawings:

Figure 1, the label, "Computer" should read "Computer 118"

Figure 1, the label, "110" should appear outside the drawing figure, immediately below the "Fig. 1" title.

Signed and Sealed this

Fifteenth Day of September, 2009

David J. Kappos  
*Director of the United States Patent and Trademark Office*